United States Patent
Foeckler, Jr. et al.

[11] Patent Number: 5,523,001
[45] Date of Patent: Jun. 4, 1996

[54] TREATMENT OF ELECTROLESS PLATING WASTE STREAMS

[75] Inventors: Eugene P. Foeckler, Jr., Richmond, Va.; Sudarshan Lal, Glen Rock, N.J.

[73] Assignee: AT&T Corp., Murray Hill, N.J.

[21] Appl. No.: 367,403

[22] Filed: Dec. 30, 1994

[51] Int. Cl.$^6$ ................ C02F 1/32; C02F 1/72
[52] U.S. Cl. .............. 210/721; 210/724; 210/748; 210/759; 210/908; 204/DIG. 13
[58] Field of Search ............ 210/724, 748, 210/759, 908, 909, 721; 204/DIG. 13

[56] References Cited

U.S. PATENT DOCUMENTS

| | | | |
|---|---|---|---|
| 4,012,321 | 3/1977 | Koubek | 210/748 |
| 4,512,900 | 4/1985 | Macur et al. | 210/759 |
| 4,792,407 | 12/1988 | Zeff et al. | 210/748 |
| 4,849,114 | 7/1989 | Zeff et al. | 210/748 |
| 4,849,115 | 7/1989 | Cole et al. | 210/748 |
| 5,174,904 | 12/1992 | Smith, II | 210/759 |
| 5,348,665 | 9/1994 | Schulte et al. | 210/759 |

FOREIGN PATENT DOCUMENTS

| | | | |
|---|---|---|---|
| 4005488 | 8/1991 | Germany | 210/748 |
| 4132672 | 4/1993 | Germany | 210/748 |
| 62-262792 | 11/1987 | Japan | 210/748 |

Primary Examiner—Peter A. Hruskoci
Assistant Examiner—Theodore M. Green
Attorney, Agent, or Firm—Lester H. Birnbaum

[57] ABSTRACT

A method for treating the waste stream resulting from electroless plating operations such as copper electroless plating. The waste stream is simultaneously treated with hydrogen peroxide and UV light to bring the level of contaminants below the discharge limit. In one embodiment, the waste stream is also diluted with rinse water from the plating process.

8 Claims, 2 Drawing Sheets

TREATMENT OF ELECTROLESS PLATING WASTE STREAMS

BACKGROUND OF THE INVENTION

This invention relates to electroless plating operations.

Electroless copper plating is a significant step in the fabrication of printed circuit boards. Currently, 15 to 25 percent of the operating electroless chemistry volume per plating cycle becomes waste due to by-product buildup. Consequently, economical methods for treating this waste need to be devised to avoid conflict with present and future environmental regulations.

For example, the effluent from a typical electroless copper bath comprises high levels of formaldehyde (approximately 2.4 gms/liter), ethylenediamine tetraacetic acid (EDTA) (approximately 42 gms/liter), and formate (approximately 15 gms/liter). According to 1995 discharge guidelines, the amount of formaldehyde should be reduced to 14 ppm, and the amount of EDTA should be reduced to 90 ppm. There is currently no limit on the amount of formate, but high levels of formate are known to lower the ratio of biological oxygen demand (BOD) to chemical oxygen demand (COD) which may upset the delicate biological environment in public treatment systems. An efficient method of organic destruction will need to impact all three constituent levels.

A further problem in electroless copper plating is the fact that the rinse water in the process also becomes contaminated with the above constituents and needs to be treated.

It is known that hydrogen peroxide can destroy the organic content of the waste stream from an electroless copper plating bath. However, the hydrogen peroxide alone cannot reduce the organics to acceptable levels in a timely manner. Thus, it has been proposed to simultaneously add hydrogen peroxide and subject the waste to irradiation by UV light, followed by subjecting the resulting composition to an ozone gas with a second irradiation by UV light. (See, e.g., U.S. Pat. No. 4,512,900 issued to Macur et al.) While such a technique may be effective, it is also expensive.

It has also been proposed to treat waste streams in general with a combination of hydrogen peroxide and irradiation with UV light. (See U.S. Pat. No. 4,012,321 issued to Koubek.) However, no teaching specific to reducing organic waste from electroless plating operations is provided.

SUMMARY OF THE INVENTION

The invention is a method for treating a waste solution including organic contaminants from an electroless process. The waste solution is diluted by the addition of water in an amount of 0.5 to 1.5 parts water to 1 part of waste solution. Hydrogen peroxide is added in an amount of 1500–2500 ppm and the pH of the resulting mixture is held within the range of 6–8. The resulting mixture is also irradiated with ultraviolet light.

BRIEF DESCRIPTION OF THE DRAWING

These and other features of the invention are delineated in detail in the description to follow. In the drawing.

It will be appreciated that, for purposes of illustration, these figures are not necessarily drawn to scale.

DETAILED DESCRIPTION OF THE INVENTION

In the embodiment described herein, the inventive method was employed with a standard copper electroless plating operation. The particular bath comprised copper oxide as a source of copper, formaldehyde as a reducing agent, ethylenediamine tetraacetic acid (EDTA) as a complexing agent and sodium hydroxide. However, other baths may be employed.

Figure 1:
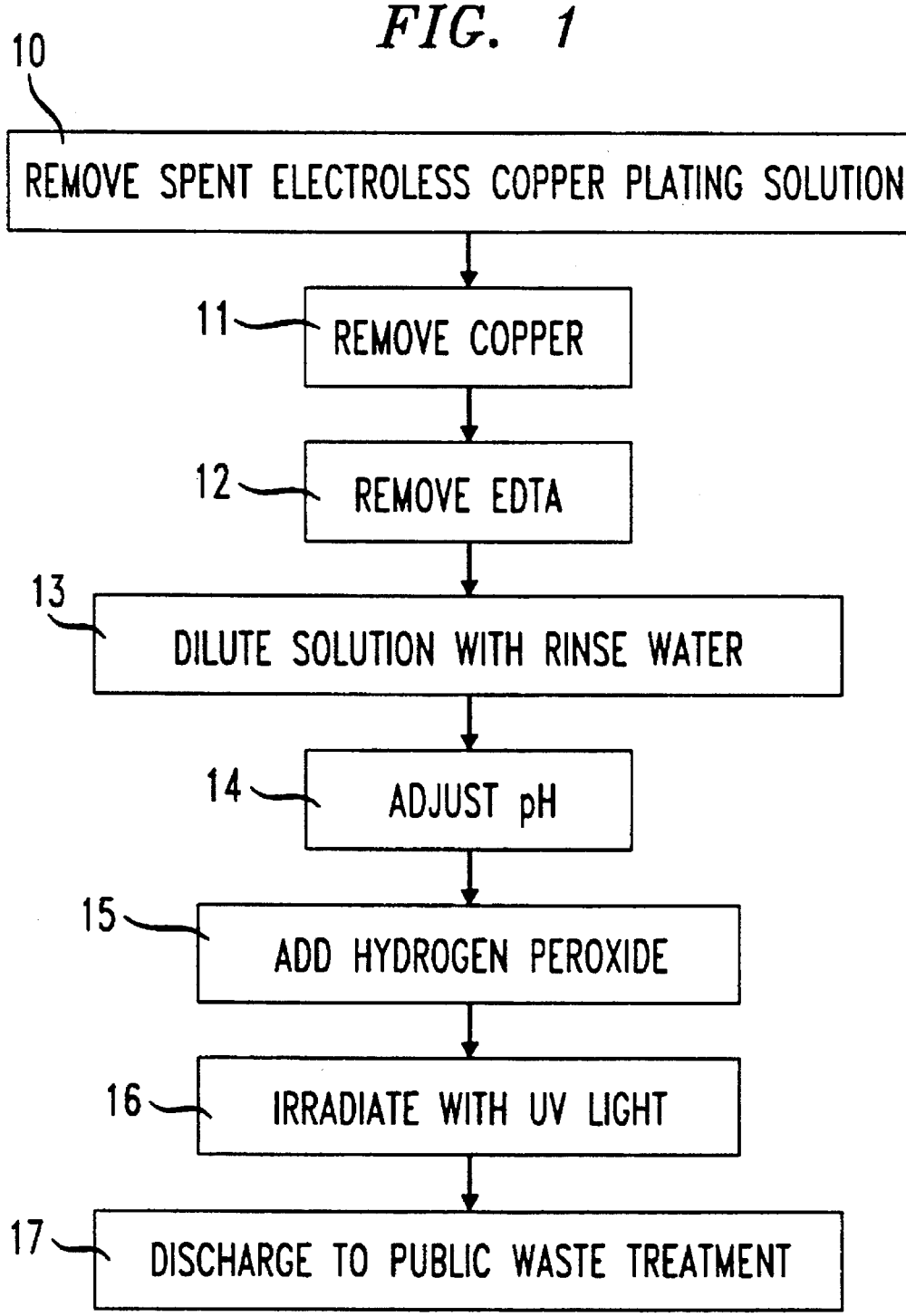
FIG. 1 is a flow diagram illustrating the steps of the invention in accordance with one embodiment.

As illustrated in the flow diagram of FIG. 1, the contaminated plating solution was removed from the plating tank at some prescribed rate, such as 250 mls/min (step 10). As removed, the solution typically included approximately 1.7 gm/liter of sodium hydroxide, 2.4 gm/liter of formaldehyde, 0.9 gm/liter of copper, 42 gm/liter of EDTA, and 15 gm/liter of formate. The pH of the solution was approximately 12.0.

The solution was then stripped of copper, for example, by the addition of sodium hydroxide and formaldehyde which convert the copper ions in solution to copper metal which is then removed (step 11). Next, as illustrated by step 12, the major portion of the EDTA was removed by adding sulfuric acid which decreased the pH of the solution causing the major portion of the EDTA to precipitate out. The resulting EDTA crystals were then removed for reuse in the electroless process. Following steps 11 and 12, the solution typically included less than 1 ppm of copper, 300–800 ppm of formaldehyde, 150–300 ppm of EDTA, and 15,000–20,000 ppm of formate. The pH of the solution was typically 1.8.

In the next step, 13, the solution was diluted by the addition of water. Rather than adding pure water, contaminated rinse water from the electroless process was employed in accordance with a feature of the invention so that the rinse water could be treated at the same time as the plating solution and so that excess salts would not build up and clog the heat exchanger (30 of FIG. 2) used in subsequent steps. Preferably, the amount of water added should be in the range of 0.5 to 1.5 parts of water per 1 part of plating solution. Too little dilution will tend to cause the heat exchanger to clog, while too much dilution is uneconomical since it increases the volume of solution to be treated.

It will be appreciated that the rinse water will contain the same contaminants as the solution, but will vary the concentrations of the mixture. In a typical example, following dilution, the solution had 199 ppm of formaldehyde, 8.94 gms/liter of formate, 216 ppm of EDTA, and a pH of 2.1.

In the next step (step 14), the pH of the solution was adjusted, in this example, by the addition of sodium hydroxide so that the pH was approximately 6.4. The pH was continuously monitored during the succeeding steps. If the pH increased, adjustment was made by adding concentrated sulfuric acid. Preferably, the pH of the solution should be kept in the range 6–8. If the solution is too acidic, special equipment may be needed which increases the cost of the treatment. If the pH is too high, the hydrogen peroxide decomposes.

Next, as illustrated by step 15, hydrogen peroxide was added to the solution. The amount of peroxide should be just sufficient to trigger an oxidation of the organic contaminants in combination with the succeeding step, since an excess of hydrogen peroxide can itself be a toxic to microorganisms downstream. It was found that a particularly effective concentration was 2000 ppm, but a range of 1500–2500 ppm is desirable. The concentration of hydrogen peroxide was also monitored during the subsequent steps and additional amounts added as needed to keep the concentration in the preferred range. The hydrogen peroxide can conveniently be added to the solution as it passes from a holding tank, 19, through an inlet, 28, to apparatus, 20. The hydrogen peroxide source, 27, was a 35 percent solution of $H_2O_2$ and water. Concentrations above 35 percent are not generally recommended due to the hazardous nature of the material.

Figure 2:
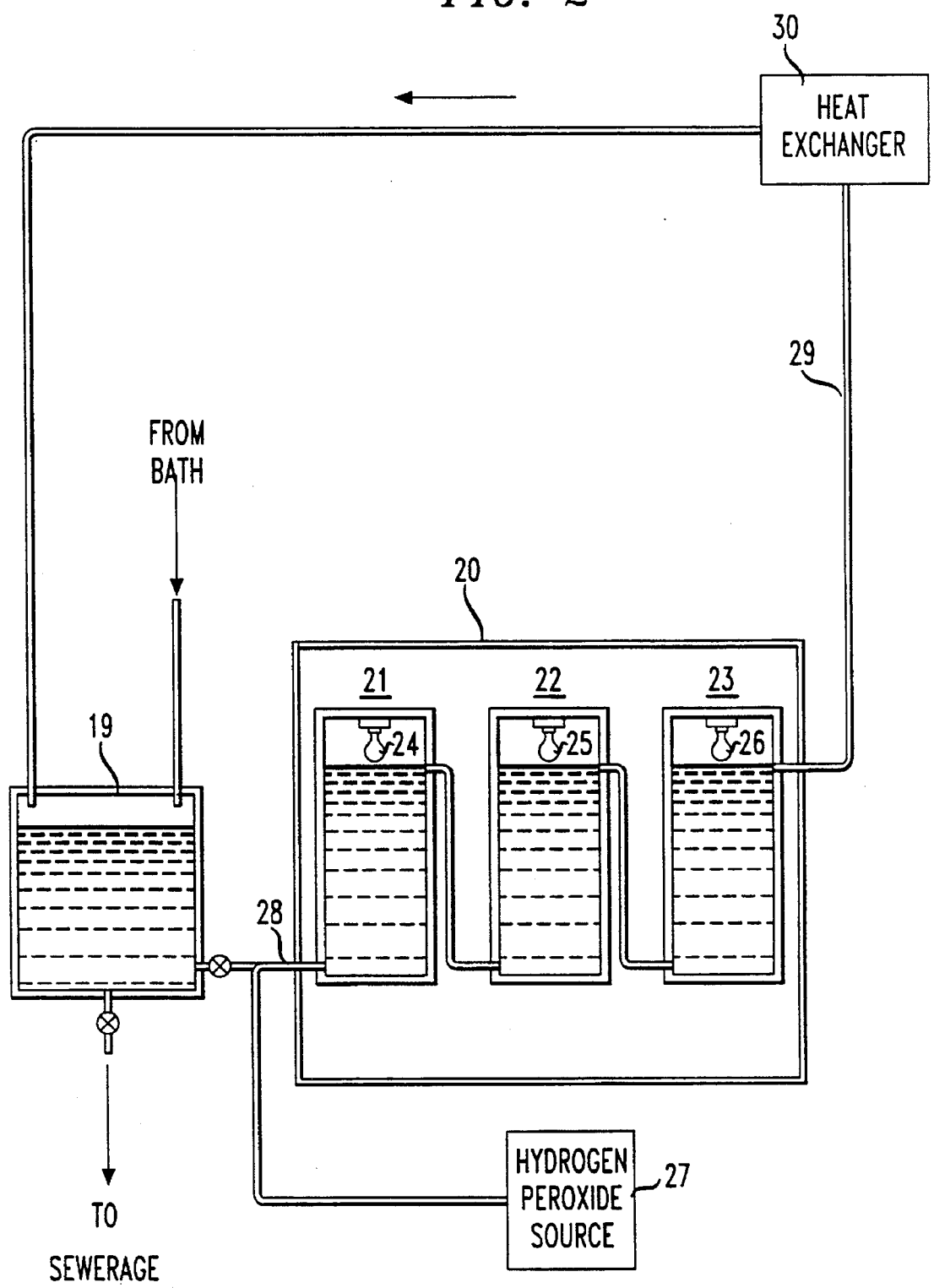
FIG. 2 is a schematic diagram of an apparatus which can be employed to practice the method of the invention in accordance with one embodiment.

The solution was then introduced into a commercially available apparatus, a portion of which is illustrated schematically in FIG. 2. The apparatus employed was a Model SSB DX-30RP PeroxPure System sold by Peroxidation Systems, Inc. The apparatus included an oxidation chamber, 20, which included three quartz tubes, 21, 22, 23, each of which included a 10 KW high intensity UV lamp, 24, 25, 26, respectively. Each lamp drew approximately 10 amps, but amperages in the range 9.0 to 11 should be useful. Each tube had a capacity of approximately 9.5 liters. The solution would take approximately sixteen minutes to run through the three tubes, which were connected in series. Hydrogen peroxide was injected by pump prior to the first lamp from a source, 27, as needed to keep the peroxide concentration constant.

The solution was introduced into the oxidation chamber through the inlet, 28, and the lamps 24–26 were activated for a time of about 96 minutes so that the solution was irradiated in accordance with step 16 of FIG. 1. Since it took 16 minutes for the solution to pass through the chamber, and the total treatment was 96 minutes, the solution was passed through 6 times (also known in the art as 6 oxidation minutes). UV light in combination with hydrogen peroxide catalyzes the chemical oxidation of the organic contaminants. This is due to the fact that organic molecules absorb UV light, and undergo structural changes which make the molecules prone to faster oxidation. The UV light also decomposes the hydrogen peroxide to produce hydroxyl radicals having a high oxidation potential. A possible mechanism for formaldehyde (HCHO) and formic acid (HCOOH) is as follows:

$$H_2O_2 \rightarrow 2OH^-$$

$$HCHO + 2OH^- \rightarrow H_2O + HCOOH$$

$$HCOOH + 2OH^- \rightarrow 2H_2O + CO_2$$

After treatment by the hydrogen peroxide and UV light, the solution was removed through an outlet, 29, and sent through a standard heat exchanger, 30, to cool the solution to a temperature of 16° to 20° C. The solution was then recirculated to the holding tank, 19, for additional treatment if necessary. The combination of hydrogen peroxide and UV light treatment in the apparatus typically should take place for a time of 2–6 oxidation minutes in order to reach the discharge limits for the contaminants. These limits for 1995 are 14 ppm for formaldehyde, and 90 ppm for EDTA. (The solution also exhibited a 5 day BOD of less than 125 ppm, which is desirable in avoiding added sewer charges.) Once these limits were reached, the solution could be disposed of in the public sewage treatment plant in accordance with step 17.

The cost of the treatment is, of course, a major factor in determining the usefulness of this approach. A primary objective is to process as much of the bath solution in as little time as possible with minimum consumption of hydrogen peroxide while still achieving the discharge limits. It was discovered that the most cost effective treatment involved a 1:1 dilution of the bath with the rinse water, a pH of the resulting mixture of 7, and an initial dosage of hydrogen peroxide of 2000 ppm. However, dilutions in the range 0.5 to 1.5 of rinse water to bath, a pH in the range 6–8, and a concentration of hydrogen peroxide in the range 1500–2500, should also be cost effective.

We claim:

1. A method for treating a waste solution including organic contaminants from an electroless process comprising the steps of:

diluting the waste solution by the addition of water in an amount of 0.5 to 1.5 parts water to 1 part waste solution;

adjusting the pH of the resulting mixture to within the range of 6–8;

adding hydrogen peroxide in an amount of 1500–2500 ppm to the resulting mixture to chemically oxidize said organic contaminants; and irradiating the resulting mixture with ultraviolet light, wherein said organic contaminants are chemically oxidized by a combination consisting essentially of hydrogen peroxide and ultraviolet light.

2. The method according to claim 1 wherein the water comprises rinse water from the electroless process.

3. The method according to claim 1 wherein the waste solution includes copper, formaldehyde, ethylenediamine tetraacetic acid, and formate.

4. The method according to claim 3 wherein, prior to adding hydrogen peroxide, copper and ethylenediamine tetraacetic acid are removed form the resulting mixture.

5. The method according to claim 3 wherein, subsequent to irradiation by ultraviolet light, the mixture has less than 14 ppm formaldehyde, and less than 90 ppm ethylenediamine tetraacetic acid.

6. The method according to claim 1 wherein the current supplied to the ultraviolet lamp is within the range 9 to 11 amps.

7. The method according to claim 1 wherein the mixture is passed through an irradiation apparatus 2–6 times within the range 2 to 6 oxidation minutes.

8. The method according to claim 1 wherein 1 part rinse water is diluted with 1 part waste solution, the pH of the resulting mixture is approximately 7, and the concentration of hydrogen peroxide is approximately 2000 ppm.

* * * * *